United States Patent Office 3,600,382
Patented Aug. 17, 1971

3,600,382
$\Delta^{4,20,22}$-BUFATRIENOLIDES
Walter Steidle, Limburgerhof, Germany, assignor to Knoll A.G. Chemische Fabriken, Ludwigshafen (Rhine), Germany
No Drawing. Filed Jan. 13, 1969, Ser. No. 790,851
Claims priority, application Germany, Jan. 16, 1968,
P 16 68 356.0
Int. Cl. C07c 173/04
U.S. Cl. 260—239.57
23 Claims

ABSTRACT OF THE DISCLOSURE $\Delta^{4,20,22}$-bufatrienolides substituted in the $3\alpha$- and $3\beta$-positions by alkoxy, hydroxyalkoxy, cycloalkoxy, benzyloxy and 2-oxacycloalkoxy moieties are disclosed as novel cardioactive compounds, as well as a method for their preparation by reaction of 3-hydroxy- and 3-glycosido- $\Delta^{4,20,22}$-bufatrienolides with appropriate hydroxy compounds or 2,3-oxacycloalkenyl ethers.

This invention relates to cardioactive $\Delta^{4,20,22}$-bufatrienolides substituted in the 3-position, and to process for preparing same.

It has been observed that the efficacy of cardiac glycoside is distinctly influenced by the identity of the substituent in the 3-position. The glycosides that occur in nature are all substituted in the 3-position by one or more sugar residues. Aglucons are seldom found. It therefore became of interest to develop compounds distinguished from known cardio-effective bufadienolides only in the identity of the substituents in the 3-position and in which the unsaturated lactone ring and the $14\beta$-hydroxy group remain. The presence of these groups is believed to be a prerequisite for significant cardiac efficacy. Unfortunately, however, the possibilities of reacting bufadienolides are limited by the sensitivity of these groups to chemical reactions.

Etherification of allyl alcohol systems in steroids (C. W. Shoppee et al., J. Chem. Soc. (1957) 3107), methyl ethers of $\Delta^4$-cardenolide compounds (P. Studer, Helv. Chim. Acta, vol. 46 (1963) 23) and methyl ethers of $\Delta^4$-cholestenol and $\Delta^4$-androstene-$3\beta,17\beta$-diol (R. Tschesche et al., Annalen, vol. 663 (1963) 157) have been described. No references have been found in the literature, however, to the preparation of $\Delta^{4,20,22}$-bufatrienolide-3-ethers.

It has now been found that $\Delta^{4,20,22}$-bufatrienolides etherified in the 3-position with an alkyl group with 1 to 3 carbon atoms, a hydroxyalkyl group with 2 or 3 carbon atoms, a cycloalkyl group with 5 or 6 carbon atoms, an aralkyl group or a 3-oxacycloalkyl group with 4 or 5 carbon atoms, are cardio-active and are also useful as intermediates. These bufatrienolides are obtainable by reacting an appropriate hydroxy compound or cycloalkenyl ether with a 3-hydroxy-$\Delta^{4,20,22}$-bufatrienolide or a 3-glycosido-$\Delta^{4,20,22}$-bufatrienolide and, if necessary or desirable, separating the resulting mixture of epimeric ethers chromatographically.

The new compounds can be prepared from glycosides as well as from aglucones. In any event, a mixture of epimeric ethers is obtained even when the starting material is a pure isomer. This mixture is separable into its individual components by chromatography.

The hydroxy compounds suitable for reaction in the method of this invention are primarily alcohols. Useful aliphatic hydroxy compounds include monohydric alcohols, such as methanol, ethanol, isopropanol, as well as polyhydric alcohols such as glycerin and ethylene glycol. Typical of useful cycloaliphatic and aralphatic hydroxy compounds are cyclopentanol, cyclohexanol and benzyl-alcohol.

The oxacycloalkenyl ethers that are appropriate for reaction with a starting bufatrienolide are the $\Delta^2$-oxa-cycloalkenyl ethers having four and five carbon atoms in the ring, i.e. 4,5-dihydrofuran and 5,6-dihydro-4H-pyran. The addition of these cyclic ethers to the 3-hydroxy group of the starting bufatrienolide takes place in the 2-position of the oxacycloalkenyl ether. This addition reaction forms a new center of asymmetry and yields four different stereoisomeric forms separable by chromatographic or other known means.

While the pH is not particularly critical to the progress of the reaction, it is particularly advantageous to carry it out in the presence of an acid catalyst, mineral acids such as hydrochloric acid, sulfuric acid or perchloric acid being especially desirable for this purpose. The reaction can, however, also be carried out in the presence of Lewis acids, such as boron, trifluoride, or in the presence of a salt of an organic base with a mineral acid, such as pyridinium hydrochloride, or with a strong cation exchanger, an organic acid, such as oxalic acid, or an organic sulfonic acid. The choice of acid may vary widely. Even silica gel can be used as a catalyst.

Generally, an excess of the ether-forming hydroxy compound is the most practical as a solvent for the reactants and reaction mixture. If it is desired to increase the solubility of the reactants, an inert solvent such as, for example, tetrahydrofuran, acetone, methylethyl ketone of dioxan may be employed.

The temperature of reaction is not critical, the only requirements being that it is sufficiently high to promote etherification at a practical rate and low enough to avoid decomposition.

These and other details of procedure, as well as typical reactants, reaction products solvents, separation procedures and the like will become more apparent from the following illustrative examples.

EXAMPLE 1

23 g. of a mixture of $3\alpha$- and $3\beta,14\beta$-dihydroxy $\Delta^{4,20,22}$-bufatrienolide (90% $\alpha$- and 10% $\beta$-form obtained as described in copending application Ser. No. 730,585 filed May 20, 1968, now abandoned are dissolved in 250 cc. methanol, reacted with 0.25 cc. concentrated hydrochloric acid and allowed to stand 55 minutes at 20° C. The reaction mixture is then neutralized with 0.1 N sodium hydroxide, the solvent is distilled off, and the residue is dissolved in toluene and a toluene-acetone mixture and added to a chromatographic column containing 1 kg. silica gel. The following fractions of $3\alpha$-methoxy-$14\beta$-hydroxy-$\Delta^{4,20,22}$-bufatrienolide contaminated with varying proportions of $3\beta$ - methoxy-$14\beta$-hydroxy-$\Delta^{4,20,22}$-bufatrienolide are obtained:

(1) 10.6 g. containing less than 4% of the epimeric form.
(2) 7.15 g. containing 10% of the epimeric form.
(3) 3.8 g. containing 30% of the epimeric form.

Chromatographic separation of 6 g. of a mixture of 30% of the β-form and 60% of the α-form dissolved in chloroform by addition to 2 kg. silica gel yields:

(A) 3.04 g. 3α - methoxy - 14β - hydroxy-$\Delta^{4,20,22}$-bufatrienolide. Melting point, 179–182° C. (from ethyl acetate); $[\alpha]_D^{20}=+62.5$ in methanol; ext.$_{355}$ 45,800.
(B) 1.1 g. mixture of the epimeric ethers.
(C) 1.6 g. 3β- methoxy - 14β - hydroxy-$\Delta^{4,20,22}$-bufatrienolide. Melting point, 190–197° C. (from ethanol); $[\alpha]_D^{20}=+6$ in chloroform, $-12$ in methanol); ext.$_{355}$ 45,000.

EXAMPLE 2

3 g. proscillaridin are dissolved in 100 cc. ethanol and 0.1 cc. concentrated hydrochloric acid and allowed to stand for four days at 20° C. The reaction mixture is neutralized with sodium hydroxide, 300 cc. water are added and then extracted twice, each time with 100 cc. ethyl acetate. Distillation of the solvent from the organic extract yields 1.9 g. of a mixture of 3α- and 3β-ethoxy-14β-hydroxy-$\Delta^{4,20,22}$-bufatrienolides.

For purification, 8.8 g. of the reaction product is dissolved in chloroform and subjected to chromatographic separation in 800 g. silica gel. The yield is:

(1) 2.86 g. 3α-ethoxy-14β-hydroxy-$\Delta^{4,20,22}$-bufatrienolide. Melting point, 139–141° C. (from benzene/hexane); $[\alpha]_D^{20}=+69$ in methanol; ext.$_{355}$ 44,400.
(2) 3.47 g. of a mixture of the epimeric ethoxy compounds.

A second chromatographic separation yields:

(A) 872 mg. 3α-ethoxy-14β-hydroxy-$\Delta^{4,20,22}$-bufatrienolide with little of the β-form.
(B) 1,041 mg. 3β-ethoxy - 14β - hydroxy-$\Delta^{4,20,22}$-bufatrienolide with traces of the epimeric ether.
(C) 730 mg. pure 3β-ethoxy-14β-hydroxy-$\Delta^{4,20,22}$-bufatrienolide. Melting point, 205–212° C. (from ethyl acetate); $[\alpha]_D^{20}=-33$ in methanol; ext.$_{355}$ 44,000.

EXAMPLE 3

6.7 g. 3α- and 3β-14β-dihydroxy-$\Delta^{4,20,22}$-bufatrienolide mixture are dissolved in 50 cc. ethanol, reacted with 0.5 cc. 1 N hydrochloric acid, allowed to stand 22 hours at room temperature and then neutralized with 0.1 N sodium hydroxide. Distilling off the solvent yields 6.9 g. of a mixture of 3α- and 3β-ethoxy-14β-hydroxy-$\Delta^{4,20,22}$-bufatrienolides, which is subjected to chromatographic separation as described in Example 2.

EXAMPLE 4

0.1 cc. concentrated hydrochloric acid is added to a solution of 4 g. 3α-14β-dihydroxy-$\Delta^{4,20,22}$-bufatrienolide in 10 cc. tetrahydrofuran and 90 cc. cyclohexanol, the reaction mixture is heated to 50° C. for two hours and neutralized with 0.1 N sodium hydroxide. Distillation of the solvent yields an oily residue that is dissolved in a little ethyl acetate. 0.14 g. insoluble scillaridin can be filtered off. The solution is subjected to chromatographic separation in silica gel with toluene to which increasing amounts of methylethylketone are added. The following fractions are obtained:

(1) 14β - hydroxy - $\Delta^{4,20,22}$-bufatrienolide-3α-cyclohexyl-ether. Melting point, 180–183° C. (from ethyl acetate/heptane); $[\alpha]_D^{20}=+62$ in methanol; ext. $_{355}$ 44,200.
(2) 14β - hydroxy - $\Delta^{4,20,22}$ - bufatrienolide-3β-cyclohexyl-ether. Melting point, 189–191° C. (from ethyl acetate/hexane); $[\alpha]_D^{20}=-28$ in methanol; ext. $_{355}$ 42,800.

EXAMPLE 5

90 cc. glycerine and 0.1 cc. concentrated hydrochloric acid are added to a solution of 4 g. 3α-14β-dihydroxy-$\Delta^{4,20,22}$-bufatrienolide in 20 cc. tetrahydrofuran, the reaction mixture is stirred for eight hours at 20° C., allowed to stand for 12 hours and then neutralized with 0.1 N sodium hydroxide. After pouring into 500 cc. water, the resulting precipitate is filtered off and dissolved in ethanol, insoluble scillaridine (0.14 g.) is filtered off, and the solvent is distilled from the mother liquor. 4.72 g. residue are obtained, consisting of ⅔ of the α-form and ⅓ of the β-form of 14β-hydroxy-$\Delta^{4,20,22}$-bufatrienolide-3-glyceryl ethers in crystalline state after chromatographic separation with 200 g. silica gel.

With repeated chromatographic separation, the pure compounds are obtained.

(1) 14β-hydroxy-$\Delta^{4,20,22}$-bufatrienolide-3α-glyceryl ether. Melting point, 154–156° C. (from ethyl acetate/hexane); $[\alpha]_D^{20}=+52$ in methanol; ext.$_{355}$ 44,200.
(2) 14β-hydroxy-$\Delta^{4,20,22}$-bufatrienolide-3β-glyceryl ether. Melting point, 180–183° C.; $[\alpha]_D^{20}=-20$ in methanol; ext.$_{355}$ 44,200.

EXAMPLE 6

0.05 cc. concentrated hydrochloric acid are added to a solution of 2 g. 3β-14β-dihydroxy-$\Delta^{4,20,22}$-bufatrienolide in 20 cc. tetrahydrofuran and 30 cc. glyerine. The reaction mixture is then treated as described in Example 5. The yield is one gram of a mixture of both epimeric ethers which can be separated chromatographically.

EXAMPLE 7

0.04 cc. concentrated hydrochloric acid are added to a solution of 3 g. 3α-14β-dihydroxy-$\Delta^{4,20,22}$-bufatrienolide in 20 cc. 5,6-dihydro-4H-pyran, stirred for twenty hours at 20° C., neutralized with sodium hydroxide and separated into phases. The organic phase yields, after drying and distillation of the solvent, a viscous residue that is reacted with hexane. The precipitated reaction product is filtered off and subjected to chromatographic separation. A mixture of various stereo-isomeric forms is obtained which is separable, upon repeated chromatographic separation, into the following pure compounds: 14β-hydroxy-$\Delta^{4,20,22}$-bufatrienolide-3α-(3'-tetrahydropyranyl)-ether.

Form 1

Melting point, 174–175° C. (from ethyl acetate/hexane); $[\alpha]_D^{20}=+116$ in methanol Form 2

Melting point, 147–148° C. (from ethyl acetate/hexane); $[\alpha]_D^{20}=+35$ in methanol.

EXAMPLE 8

3 g. 3β-14β-dihydroxy-$\Delta^{4,20,22}$-bufatrienolide were stirred for three days at room temperature with 40 cc. 5,6-dihydro-4H-pyran and 0.08 cc. concentrated hydrochloric acid. After filtering off insoluble by-products (1.3 g.), the reaction mixture was treated as described in Example 7. After chromatographic separation, one gram of the ether mixture was obtained, which yields stereoisomer Form 1 of 14β-hydroxy-$\Delta^{4,20,22}$-bufatrienolide-3β-(3'-tetrahydropyranyl)-ether.

Form 1

Melting point, 220–230° C. (from methanol)
$[\alpha]_D^{20}=+36$
in chloroform;
Ext.$_{355}$ 45,800. Form 2 was isolated in pure from by Craig distribution.
Melting point, 191–192° C.; $[\alpha]_D^{20}=-8$ in chloroform.

EXAMPLE 9

75 g. scilliglaucosidinrhamnoside are dissolved in 3 liters 2% sulfuric acid. The reaction mixture is heated for 40 minutes on a water bath, an equal volume of ice water is added, and neutralized with 1 N sodium hydroxide. The solution is shaken three times, each time with 2 liters ethyl acetate. After evaporation of the solvent, 54 g. crude product are obtained. Chromatographic separation yields the two isomeric methyl ethers, which are purified as described in Example 1. The yield is:

(1) 3α-methoxy - 14β - hydroxy-19-oxo-Δ$^{4,20,22}$-bufatrienolide. Melting point, 210° C. (from ethanol); $[\alpha]_D^{20}=+131$ in methanol; ext.$_{355}$ 44,500.
(2) 3β-methoxy - 14β - hydroxy - 19 - oxo-Δ$^{4,20,22}$-bufatrienolide. Melting point, 189–193° C.; $[\alpha]_D^{20}=+31$; ext.$_{355}$ 42,400.

EXAMPLE 10

50 mg. 3β,14β-dihydroxy-19-oxo-Δ$^{4,20,22}$-bufatrienolide are dissolved in 10 cc. methanol and allowed to stand 63 hours at room temperature after addition of 0.01 cc. 1 N hydrochloric acid. The further preparation and isolation of the methoxy compound is carried out as described in Example 9.

EXAMPLE 11

2.48 g. 3α- and 3β-14β,19-trihydroxy-Δ$^{4,20,22}$-bufatrienolide are dissolved in 24 cc. 0.01 N methanolic hydrochloric acid. The reaction mixture is kept for 2 hours at 20° C. and neutralized with 0.1 N sodium hydroxide. After evaporation of the solvents 2.5 g. residue is obtained. The residue is dissolved in chloroform and subjected to chromatographic separation on silica gel using chloroform with 10% acetone as elution solvent. The following fractions are obtained:

(1) 3α-methoxy - 14β - 19 - dihydroxy-Δ$^{4,20,22}$-bufatrienolide. Melting point, 179–184° C. (from acetone/hexane); $[\alpha]_D^{25}=+48$ in methanol.
(2) 3β-methoxy - 14β - 19 - dihydroxy-Δ$^{4,20,22}$-bufatrienolide. Melting point, 184–186° C. (from acetone); $[\alpha]_D^{25}=-8$ in methanol.

EXAMPLE 12

To a solution of a mixture of 3α- and 3β-14β-dihydroxy-Δ$^{4,20,22}$-bufatrienolide in 30 cc. tetrahydrofuran there are added 3.0 g. Ag$_2$O and 5 cc. benzylbromide. The reaction mixture is stirred for 1 hour at 20° C. After adding 5 cc. methanol, the reaction mixture is stirred for an additional hour.

The precipitate is filtered off, the residue washed with ethyl acetate and the filtrate combined with the washing solution. Distillation of the solvent yields a residue that is dissolved in 10 cc. chloroform and subjected to chromatographic separation on a silica gel column (140 x 3 cm.). One obtains:

3α-benzyloxy-14β-hydroxy-Δ$^{4,20,22}$-bufatrienolide
R$_F$-value=0.35 in chloroform/ethyl acetate
3β-benzyloxy-14β-hydroxy-Δ$^{4,20,22}$-bufatrienolide and
R$_F$-value=0.35 in chloroform/ethyl acetate.

As indicated earlier the compounds of this invention are cardioactive. The effect of the new compounds on guinea pigs is set forth in the following table.

The determinations were according to the modified method of Knaffl—Lenz J. Pharm. and Experim. Ther. 29, 407 (1926).

In the table:

A=3α-methoxy-14β-hydroxy-Δ$^{4,20,22}$-bufatrienolide;
B=3β-methoxy-14β-hydroxy-Δ$^{4,20,22}$-bufatrienolide;
C=3α-ethoxy-14β-hydroxy-Δ$^{4,20,22}$-bufatrienolide;
D=3β-ethoxy-14β-hydroxy-Δ$^{4,20,22}$-bufatrienolide;
E=14β-hydroxy-Δ$^{4,20,22}$-bufatrienolide-3α-(2'-tetrahydropyranyl)-ether (form A);
F=14β-hydroxy-Δ$^{4,20,22}$-bufatrienolide-3β- 3'-tetrahydropyranyl)-ether (form B);
G=3α-methoxy-14β-hydroxy-19-oxo-Δ$^{4,20,22}$-bufatrienolide;
H=3β-methoxy-14β-hydroxy-19-oxo-Δ$^{4,20,22}$-bufatrienolide;
J=14β-hydroxy-Δ$^{4,20,22}$-bufatrienolide-3β-glycerylether.

TABLE

| | Infusions rate | | |
|---|---|---|---|
| | Minutes | Minutes/kg. | Tite) (mg./kg.r |
| Compound: | | | |
| A | 96 | 245 | 3.05 |
| B | 139 | 353 | 0.56 |
| C | 31 | 83 | 2.76 |
| D | 64 | 64 | 1.10 |
| E | 58 | 117 | 2.73 |
| F | 41 | 115 | 2.22 |
| G | 81 | 253 | 0.66 |
| H | 63 | 200 | 0.50 |
| J | 15 | 43 | 0.54 |

Compound J shows in the cat a titer of 0.165 mg./kg. and a resorption of 53%.

The new compounds can be administered orally in the form of tablets or dragees. The dosage of the new compounds depends on their absorption quotient, their maximum effective concentration, and their dissipation quotient, and must be individually determined in patients.

The absorption quotient measures in percent the amount of the new compounds which is transferred to the bloodstream from the stomach-intestinal-tract after oral administration, i.e. the amount which is absorbed and is therapeutically effective. For the new compounds, this is in the region of about 10–60 percent.

The maximum effective concentration is the amount of compound present in the organism which so saturates the organism that a full thereapeutic effect on the heart is obtained. In this manner, heart-insufficiency is relieved and the patient is compensated. The maximum effective concentration of the new compounds, compared with known cardioactive compounds of similar structure, can be in the region of 0.4–0.6 milligram of compound per patient.

The dissipation quotient measures, in percent, the amount of glycoside which is inactivated 24 hours after absorption is achieved. For the new compounds, this can lie in the region of 20–40 percent.

The absorption and dissipation quotients are essentially entities independent of the individual, whereas the maximum effective concentration is very strongly individually dependent. Therefore, individual dosage varies considerably from patient to patient and is subject to strict rules. A cardioactive compound is administered in a proper dosage if the maximum effective concentration is reached in a suitable period of time and is maintained by the administration of further glycosides which replace the daily losses of efficacy.

In patients without previous treatment, the maximum effective concentration is reached on the administration of 0.5–8.0 mg. of active agent on the first day. For extended therapy, an average daily administration of 0.5–5.0 mg. of compound is sufficient. This dosage can be increased, if necessary, according to need.

Tablets or dragées for administering the new compounds may contain 0.25, 0.5, or 1.0 mg. of active substance.

Tablets containing about 0.25 milligram of active compound can be prepared as follows. About 0.25 mg. of the active substance are combined with 80 mg. of inert filler. The active compound can be worked into the filler either in the form of a 2–5 percent admixture of the active substance with starch, or as a 10 percent alcoholic solution. The active compound can also be added in the form of a 10–20 percent solution of polyvinyl pyrrolidone, in which case this mixture is then worked into the filler.

The inert filler can comprise starch, a granulating agent, and a lubricant. Cornstarch or wheat starch can be employed, in which case a portion of the starch (10–20 percent) can optionally be replaced by purified white microcrystalline cellulose having a molecular weight of 30,000–50,000 and a particle size of 10–50 microns ("Avicel"), or can be replaced by polyvinyl pyrrolidone ("Kollidon," "Luviskol VA 64").

As the granulating agent, a 5–20 percent gelatin solution or a 5–10 percent solution of potato starch, or a 10–20 percent solution of polyvinyl pyrrolidone in a polar organic solvent such as ethanol, isopropanol, or acetone can be used as the lubricant, metal soaps such as magnesium stearate and calcium arachinate, stearin, or talc-silicic acid or talc-stearin can be added.

The admixed active compound and filler is pressed into tablets in the usual way. The tablets preferably have a diameter of 6 millimeters and a thickness of 3 millimeters and weigh 80 mg. The hardness of the tablets amounts to about 3 kg., measured with a "Stokes" hardness tester.

For the preparation of dragées containing about 0.25 milligram of the active compound, the following composition can be used: 0.25 mg. active agent, up to 80 mg. of inert fillers, and up to 120 mg. of colourless sweeteners. The formation of dragées can take place in the usual way as is described, for example in the "Galenischen Prakticum" of Muenzel-Buechi-Schultz, pages 778–786 (1959) or as described in von Koehler, Deutsche Apotheker-Zeitung 99 No. 33, pages 803–807 (1959).

What is claimed is:

1. $\Delta^{4,20,22}$-bufatrienolide substituted in the 3-position by an alkoxy group with 1 to 3 carbon atoms, a hydroxyalkoxy group with 2 or 3 carbon atoms, a cycloalkoxy group with 5 to 6 carbon atoms, a 2′-oxacycloalkoxy group with 4 or 5 carbon atoms or an aralkyloxy group.

2. $\Delta^{4,20,22}$-bufatrienolide as defined in claim 1 wherein the 3-position is substituted by lower alkoxy of 1 to 3 carbon atoms.

3. $\Delta^{4,20,22}$-bufatrienolide as defined in claim 1 wherein the 3-position is substituted by cycloalkoxy of 5 to 6 carbon atoms.

4. $\Delta^{4,20,22}$-bufatrienolide as defined in claim 1 wherein the 3-position is substituted by glyceryloxy.

5. $\Delta^{4,20,22}$-bufatrienolide as defined in claim 1 wherein the 3-position is substituted by 2′-oxacycloalkoxy of 4 to 5 carbon atoms.

6. 3-alkoxy-19-oxa-$\Delta^{4,20,22}$-bufatrienolide.

7. 3α-methoxy-14β-hydroxy-$\Delta^{4,20,22}$-bufatrienolide.

8. 3β-methoxy-14β-hydroxy-$\Delta^{4,20,22}$-bufatrienolide.

9. 3α-ethoxy-14β-hydroxy-$\Delta^{4,20,22}$-bufatrienolide.

10. 3β-ethoxy-14β-hydroxy-$\Delta^{4,20,22}$-bufatrienolide.

11. 3α-benzyloxy-14β-hydroxy-$\Delta^{4,20,22}$-bufatrienolide.

12. 3β-benzyloxy-14β-hydroxy-$\Delta^{4,20,22}$-bufatrienolide.

13. 14β - hydroxy - $\Delta^{4,20,22}$ - bufatrienolide-3α-cyclohexylether.

14. 14β - hydroxy - $\Delta^{4,20,22}$ - bufatrienolide-3β-cyclohexylether.

15. 14β - hydroxy - $\Delta^{4,20,22}$ - bufatrienolide - 3α-glycerylether.

16. 14β - hydroxy - $\Delta^{4,20,22}$ - bufatrienolide - 3β-glycerylether.

17. 14β - hydroxy - $\Delta^{4,20,22}$-bufatrienolide-3α-(3′-tetrahydropyranyl)-ether.

18. 14β - hydroxy - $\Delta^{4,20,22}$ - bufatrienolide-3β-(3′-tetrahydropyranyl)-ether.

19. 3α - methoxy - 14β-hydroxy-19-oxo-$\Delta^{4,20,22}$-bufatrienolide.

20. 3β - methoxy - 14β-hydroxy-19-oxo-$\Delta^{4,20,22}$-bufatrienolide.

21. 3α - methoxy - 14β,19 - dihydroxy-$\Delta^{4,20,22}$-bufatrienolide.

22. 3β - methoxy - 14β,19 - dihydroxy-$\Delta^{4,20,22}$-bufatrienolide.

23. Process which comprises reacting a compound selected from the group consisting of 3-hydroxy- and 3-glycosido-$\Delta^{4,20,22}$-bufatrienolide with a compound selected from the group consisting of methanol, ethanol, isopropanol, glycerin, ethylene glycol, cyclopentanol, cyclohexanoyl, benzyl alcohol, 4,5-dihydrofuran and 5,6-dihydro-4H-pyran and separating the resulting mixture of epimeric ethers chromatographically.

References Cited

UNITED STATES PATENTS 3,134,772  5/1964  Kondo et al. _____ 260—239.57

ELBERT L. ROBERTS, Primary Examiner

U.S. Cl. X.R.

424—241; 260—210.5